Aug. 20, 1940.  E. A. JOHNSTON  2,211,896
TRUCK CHAIN CONSTRUCTION
Filed Oct. 21, 1938  3 Sheets-Sheet 1
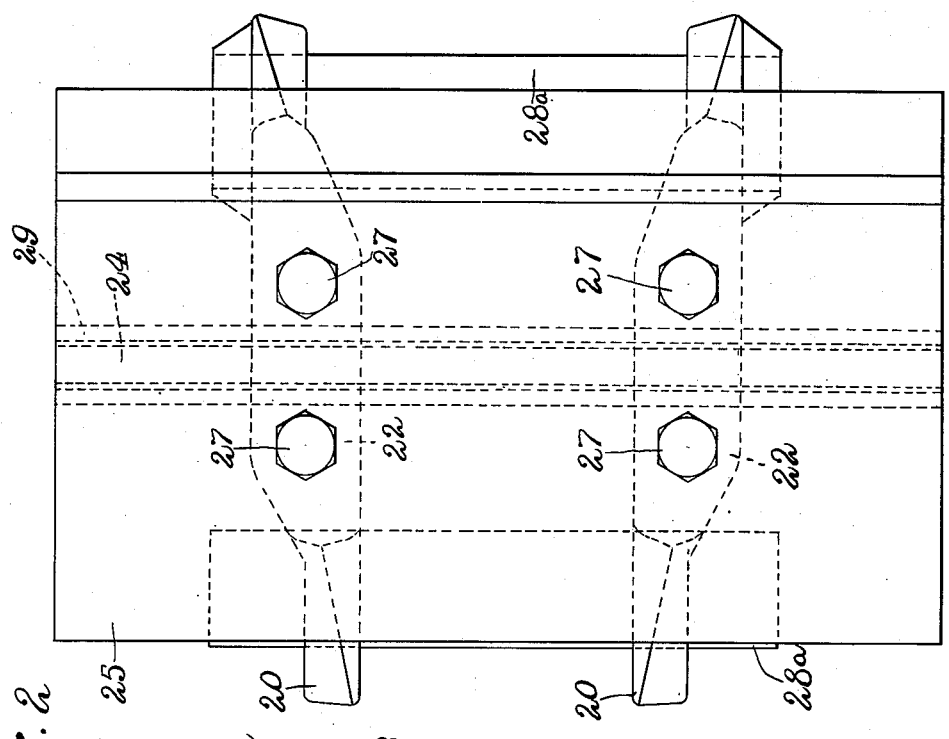
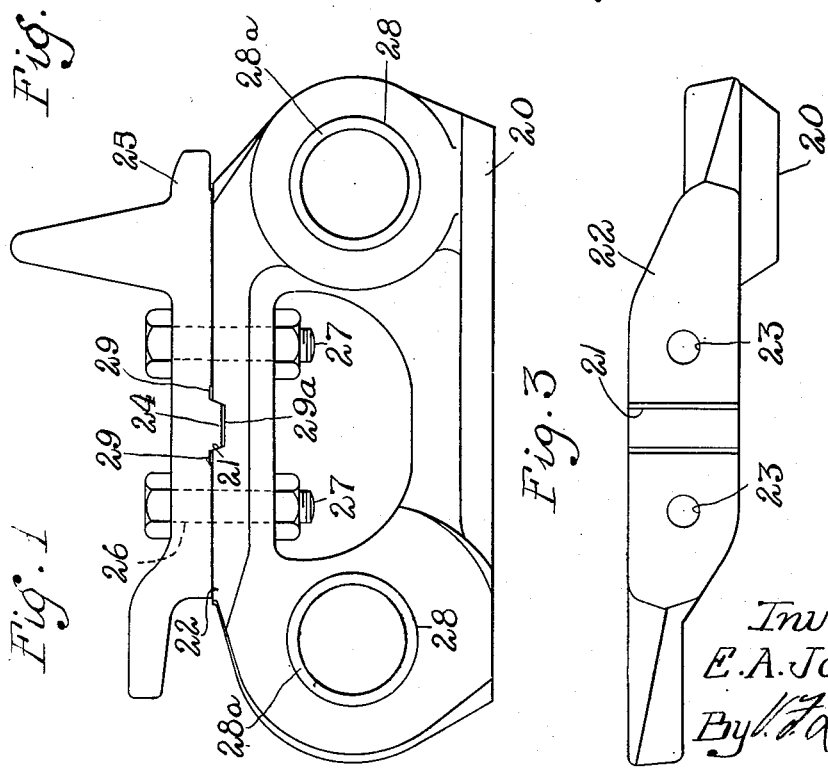
Inventor
E. A. Johnston

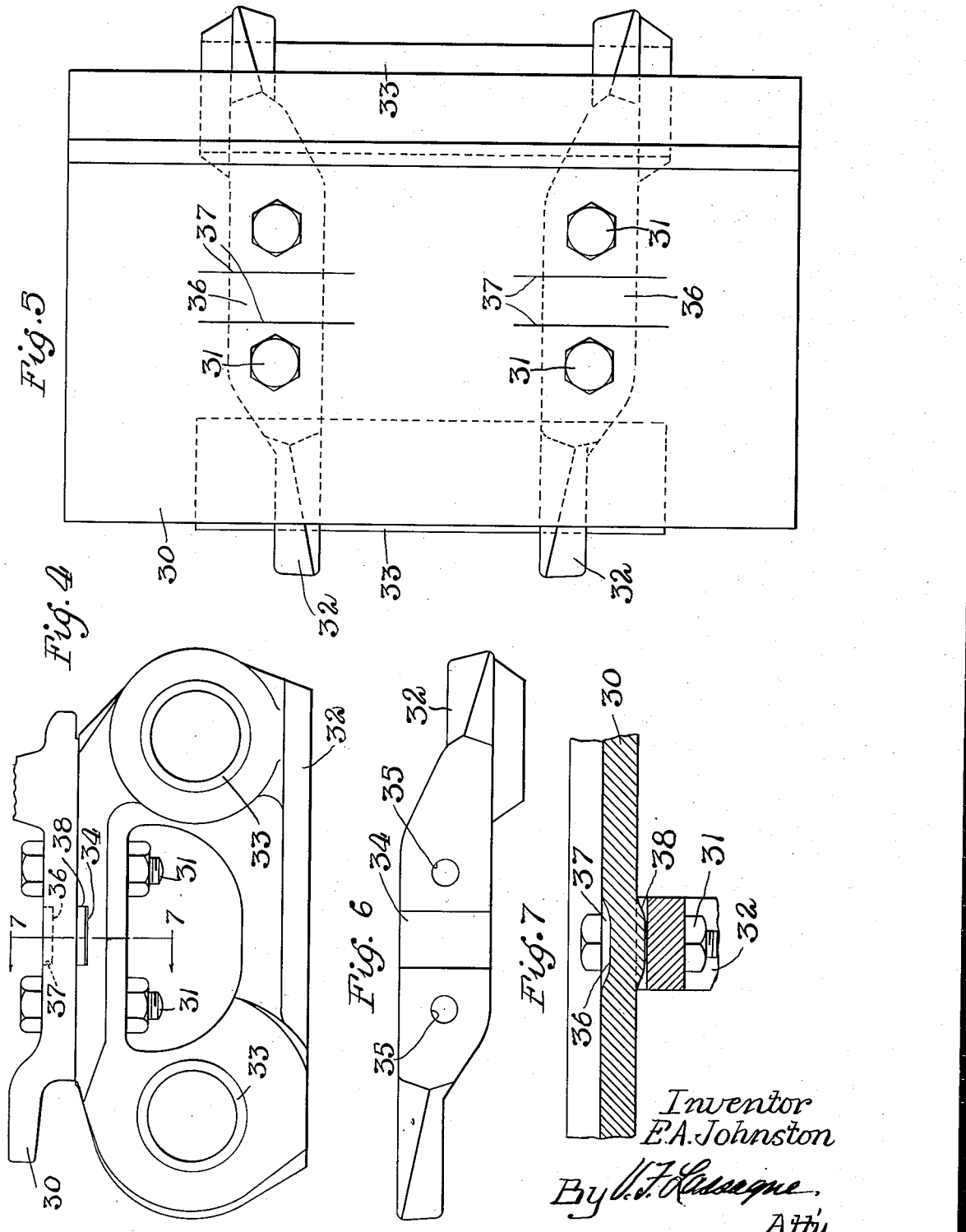

Aug. 20, 1940.     E. A. JOHNSTON     2,211,896
TRUCK CHAIN CONSTRUCTION
Filed Oct. 21, 1938     3 Sheets-Sheet 3
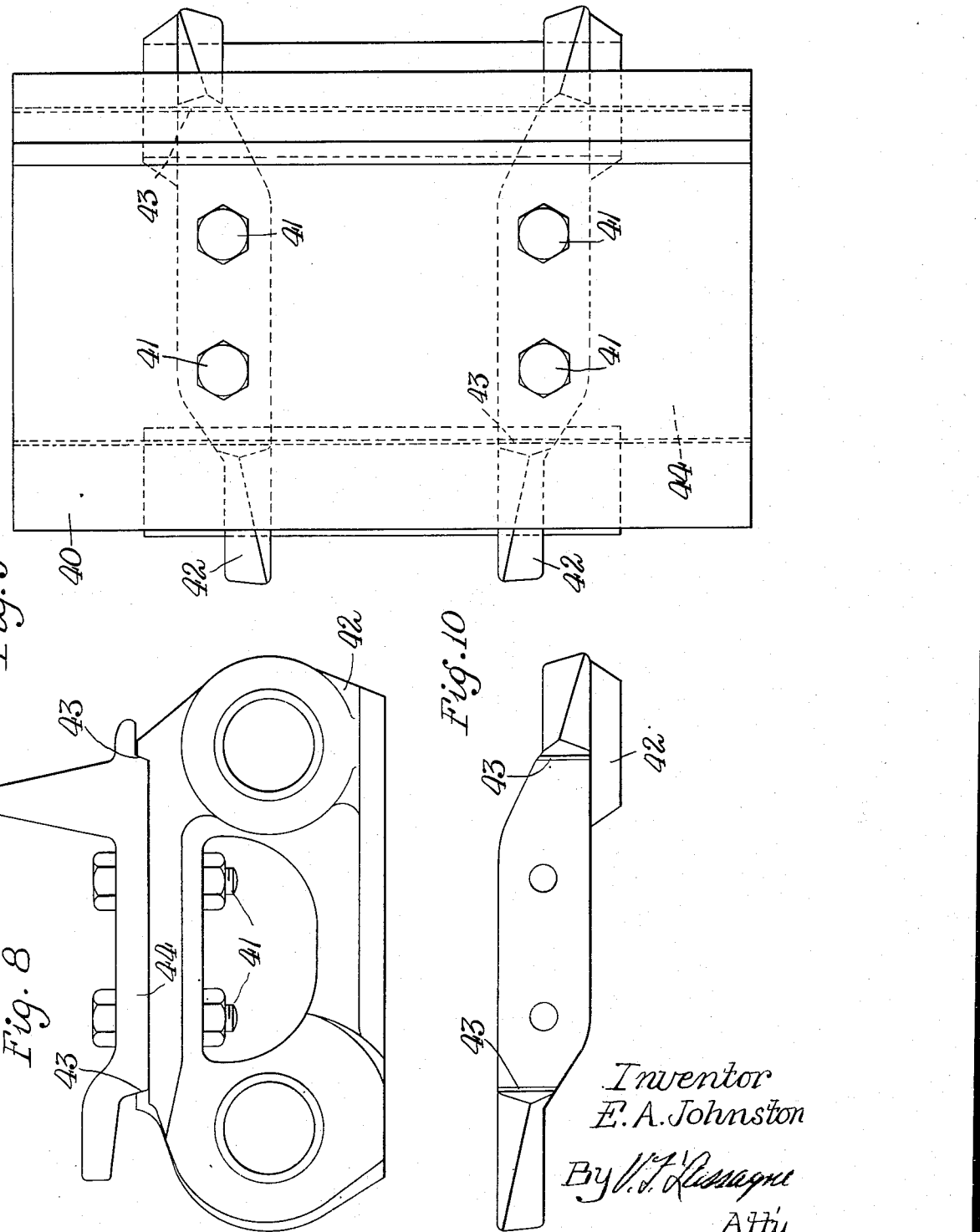
Inventor
E. A. Johnston
By V. J. Lussagne
Atty Patented Aug. 20, 1940

2,211,896

UNITED STATES PATENT OFFICE 2,211,896

TRACK CHAIN CONSTRUCTION

Edward A. Johnston, Chicago, Ill., assignor to International Harvester Company, a corporation of New Jersey Application October 21, 1938, Serial No. 236,272

4 Claims. (Cl. 305—10)

This invention relates to a track chain construction for crawler tractors and more particularly to a means and manner of attaching shoes or grouters to the respective pairs of track links comprising the track chain.

As is well known to those skilled in the art, such chains are in common use on tractors of the crawler type and various types of shoes or grouters have been devised to increase the traction of the chains according to the various surface conditions of the ground over which the tractors may be operated. It is found on numerous occasions that the shoes or grouters cannot be suitably secured to the track chain so as to remain thereon over a long period of time or under adverse circumstances. This difficulty is caused mainly by loosening of the bolts utilized to secure the shoes to the track chain links.

The principal object of the invention is to provide an improved track chain construction in which track shoes or grouters may be suitably secured to the links of the chain, said construction including interlocking means between each shoe and the respective pair of links for the purpose of removing the driving strain from the bolts securing the shoe to the links.

Another object is to provide a track link and grouter assembly in which the under surface of the grouter fits substantially tightly against the upper surfaces of the transversely spaced links.

Another object is to provide various forms of the construction in which the grouters and links may be easily formed and assembled.

The desirable and important objects and features of the invention are achieved by the provision of a transverse slot formed in each of a pair of transversely spaced track chain links, the slots being disposed in transverse alinement when the links are assembled and receiving a transverse rib or key formed on the under surface of a shoe or grouter. A pair of bolts disposed in comparatively widely, longitudinally spaced relation is passed through each link and the shoe for securing the same together. The interlocking of the shoe and links by means of the transverse groove and rib removes the driving strain from the bolts. The shoe is secured tightly to the links and relative twisting of the parts is prevented. In a preferred type of construction, each pair of links is rigidly assembled by means of a pair of longitudinally spaced, transversely disposed bushings through which the pins of adjacent links are passed to complete the track chain assembly.

A further understanding of the objects and features of the invention may be had from the accompanying sheets of drawings, in which:

Figure 1 is a side elevational view showing a track link and shoe or grouter secured together in the manner provided by the invention;

Figure 2 is a plan elevational view of the same;

Figure 3 is a plan elevational view of the attaching surface of one chain link;

Figures 4, 5, 6 and 7 are similar views of a modified form of construction, Figure 7 being a vertical sectional view taken on the line 7—7 of Figure 4; and, Figures 8, 9 and 10 illustrate another modified form of the construction.

Looking now to Figures 1, 2 and 3, it will be seen that a pair of transversely spaced and alined track chain links 20 are provided respectively with grooves 21 disposed centrally in the upper surfaces 22 thereof and transversely of the longitudinal extent of the chain assembly. The upper surface of each link is further provided with a pair of bores 23, one disposed at each side of the transverse groove 21. The transverse grooves 21 are adapted to receive a transverse rib or key 24 formed on the under surface of a track shoe or grouter 25. The ground engaging portion of these shoes or grouters may be of any desirable form and forms no part of the present invention. The shoe is provided with spaced openings 26 through which bolts 27 are passed for securing the shoe to the links, the bolts passing respectively through the openings 23 in the links for disposing the links in transversely spaced relation. The links are provided at each end with transversely alined openings 28 through which bushings 28a are passed for interconnecting the pairs of links with other similar links in a track chain assembly, not shown.

The upper surfaces 22 of the links 20 are substantially flat, except for the groove 21. The under surface of the shoe 25 is also substantially flat except for the rib or key portion 24, which, when the parts are assembled, fits the grooves in the links. The flat under surface of the shoe thereby lies substantially tightly against the flat upper surface of the links 23 and is secured thereto by means of the bolts 27. In this manner, the bolts serve only to secure the parts together, the driving strain being taken by the interlocking portions of the shoe and links through the medium of the rib 24 and grooves 21, respectively. The under surface of the shoe 25 is slightly cut out along each side of the rib 24, as at 29, and it will be seen that the rib does not extend entirely downwardly into the groove 21, being slightly spaced therefrom, as at 29a. It will be noted that the sides of the rib 24 in the grooves 21 are sloping or diverging, thus providing a wedging action therebetween. This provision is for the purpose of facilitating manufacture and assembling of the links and shoes and slight differences in size between these portions of the parts are immaterial.

In the modified form of construction shown in Figures 4 to 7, a shoe or grouter 30 is rigidly secured by means of bolts 31 to a pair of transversely spaced track chain links 32. These links are provided at opposite ends with transverse bushings 33 through which pins may be passed to interconnect the links with similar links comprising track chain assemblies, not shown. In this form of construction, the flat upper surface of each link 32 is formed with a transverse groove or key-way 34, these grooves or key-ways being in alinement transversely of the chain assembly when the links are assembled, as in Figure 5. Each link is further provided with a pair of openings 35, one disposed at each side of the groove 34, for receiving the bolts 31. A pair of downwardly extending rib or key portions 36 is formed in alinement on the shoe 30, the alinement being transversely of the links to which the shoe is secured. These ribs or keys 36 are preferably formed in the shoe by pressing the same downwardly from the body of the shoe, thus separating the ribs from the shoe along the lines 37, leaving straight forward or rearward edges on each rib, as at 38, for engaging the forward and rearward sides of the transverse grooves 34 in the links 32. These ribs 36 may be conveniently formed by means of incompletely shearing the shoe at the desired points. This is best shown in Figure 7.

In the other modified form of construction shown in Figures 8, 9 and 10, a shoe or grouter 40 is secured by bolts 41 to the upper surfaces of a pair of transversely alined and spaced track chain links 42. These links are similar to the previously described links and are interconnected in a track chain assembly in the same manner. In this form of the invention, substantially the entire upper surface of each link 42 is cut away to form an elongated transverse groove or key-way 43. Substantially the entire under surface of the shoe or grouter 40 is formed as a transverse rib or key which fits the grooves 43 in the links, these grooves being transversely alined when the links are assembled. The upper surface of the groove 43 is substantially flat throughout its extent and cooperates with the flat under surface of the rib or key 44 of the shoe 40 for enabling the parts to be tightly secured together by the bolts 41. In this manner, driving strain is taken by the interlocking portions of the shoe and links and is not imparted to the bolts 41. Here also, the grooves 43 and rib 44 have sloping or diverging sides and a tight fit between the parts is assured.

From the foregoing description, it will be seen that a new and improved construction has been provided involving the assembling of shoes or grouters and their respective pairs of track links comprising track chain assembly, the invention being illustrated by the three preferred forms described in connection therewith. It will be seen that various desirable and important features are obtainable by the modified forms of construction described, and numerous other objects will be readily apparent to those skilled in the art. It will be further apparent that numerous alterations and modifications may be made in the constructions without departing from the spirit and scope of the invention defined in the appended claims.

What is claimed is:

1. In a track chain assembly, the combination of a pair of alined, transversely spaced links arranged longitudinally in the assembly, each link having an upper edge formed with a transverse groove therein, said grooves being alined transversely of the links, a shoe member carried by the links and having a pair of transverse ribs pressed downwardly from the body of the shoe at transversely spaced points corresponding to the transverse spacing of the links, said ribs respectively fitting the grooves in the links, and securing means for securing the shoe to the links.

2. In a track chain assembly, the combination of a pair of alined, transversely spaced links arranged longitudinally in the assembly, each link having an upper edge formed with a transverse groove therein substantially centrally thereof, a shoe member carried by the links and having a pair of transverse ribs pressed downwardly from the body of the shoe at transversely spaced points corresponding to the transverse spacing of the links, said ribs respectively fitting the grooves in the links, and a pair of bolts passed through each link and the shoe respectively at each side of the groove for securing the shoe to the links.

3. In a track chain assembly, the combination of a pair of alined, transversely spaced links arranged longitudinally in the assembly, each link having an upper edge formed with a transverse groove therein substantially centrally thereof, a shoe member carried by the links and having a pair of transverse ribs pressed downwardly from the body of the shoe at transversely spaced points corresponding to the transverse spacing of the links, said ribs respectively fitting the grooves in the links, and a pair of bolts passed through each link and the shoe respectively at each side of the groove securing the shoe to the links, the portions of the shoe in the vicinity of the bolts abutting the upper edges of the links.

4. In a track chain assembly, the combination of a pair of alined, transversely spaced links arranged longitudinally in the assembly, each link having an upper edge formed with a transverse groove therein, said grooves being transversely alined, each of said grooves having its opposite front and rear sides straight and at right angles to the upper edge, a shoe member carried by the links and having a pair of transverse ribs pressed downwardly from the body of the shoe at transversely spaced points corresponding to the transverse spacing of the links to fit the grooves in the links, each rib having front and rear straight sides tightly engaging the straight sides of a respective groove in a link, and securing means securing the links to the shoe.

EDWARD A. JOHNSTON.